United States Patent [19]
Decky et al.

[11] Patent Number: 5,373,593
[45] Date of Patent: Dec. 20, 1994

[54] HAND CART FOR LIFTING AND TRANSPORTING TOILETS

[76] Inventors: John R. Decky, 4731 Pebble Bay Cir., Vero Beach, Fla. 32963; Louis F. Atzel, 20 Raven Rock Rd., Boone, N.C. 28607

[21] Appl. No.: 45,592

[22] Filed: Apr. 9, 1993

[51] Int. Cl.⁵ .......................... A47K 4/00; B60P 1/10
[52] U.S. Cl. .................................. 4/661; 254/7 R; 269/17; 414/460
[58] Field of Search .................. 4/661; 254/7 R, 7 B; 269/17; 414/460

[56] References Cited

U.S. PATENT DOCUMENTS

| | | | |
|---|---|---|---|
| 3,262,590 | 7/1966 | Lynn | 414/460 |
| 3,391,905 | 7/1968 | Burns | 254/7 R |
| 4,722,571 | 2/1988 | Chitwood | 254/7 R |
| 5,203,065 | 4/1993 | Peters | 29/281.4 |

*Primary Examiner*—Charles E. Phillips
*Attorney, Agent, or Firm*—Aquilino & Welsh

[57] ABSTRACT

A hand cart for lifting, transporting and installing toilets, including a wheeled base and frame designed to straddle a toilet. The lifting member includes a hand operated screw jack and ball engaging grapples and a rim clamp to securely hold the toilet on the cart during the lifting and transporting process.

9 Claims, 3 Drawing Sheets

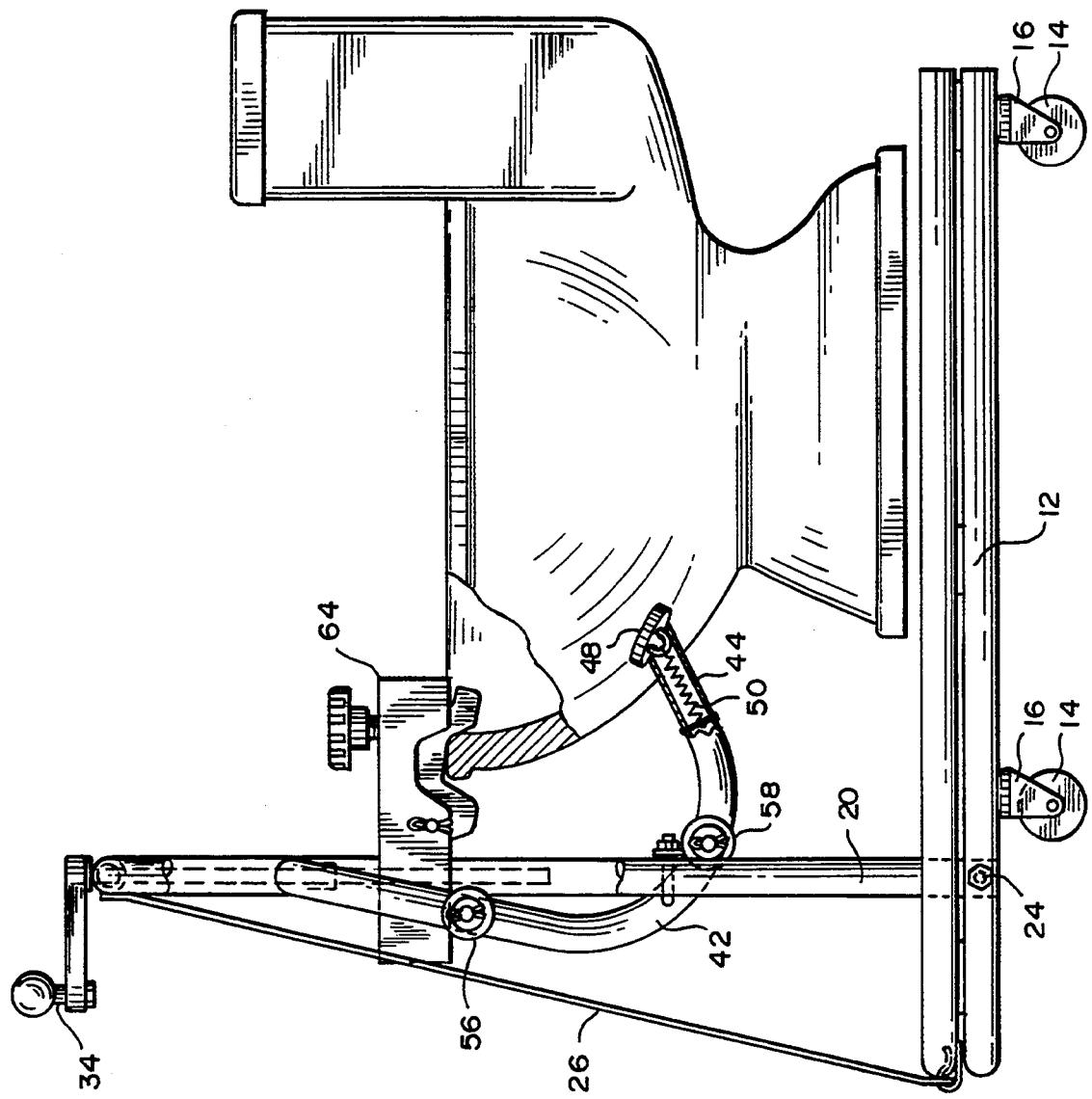

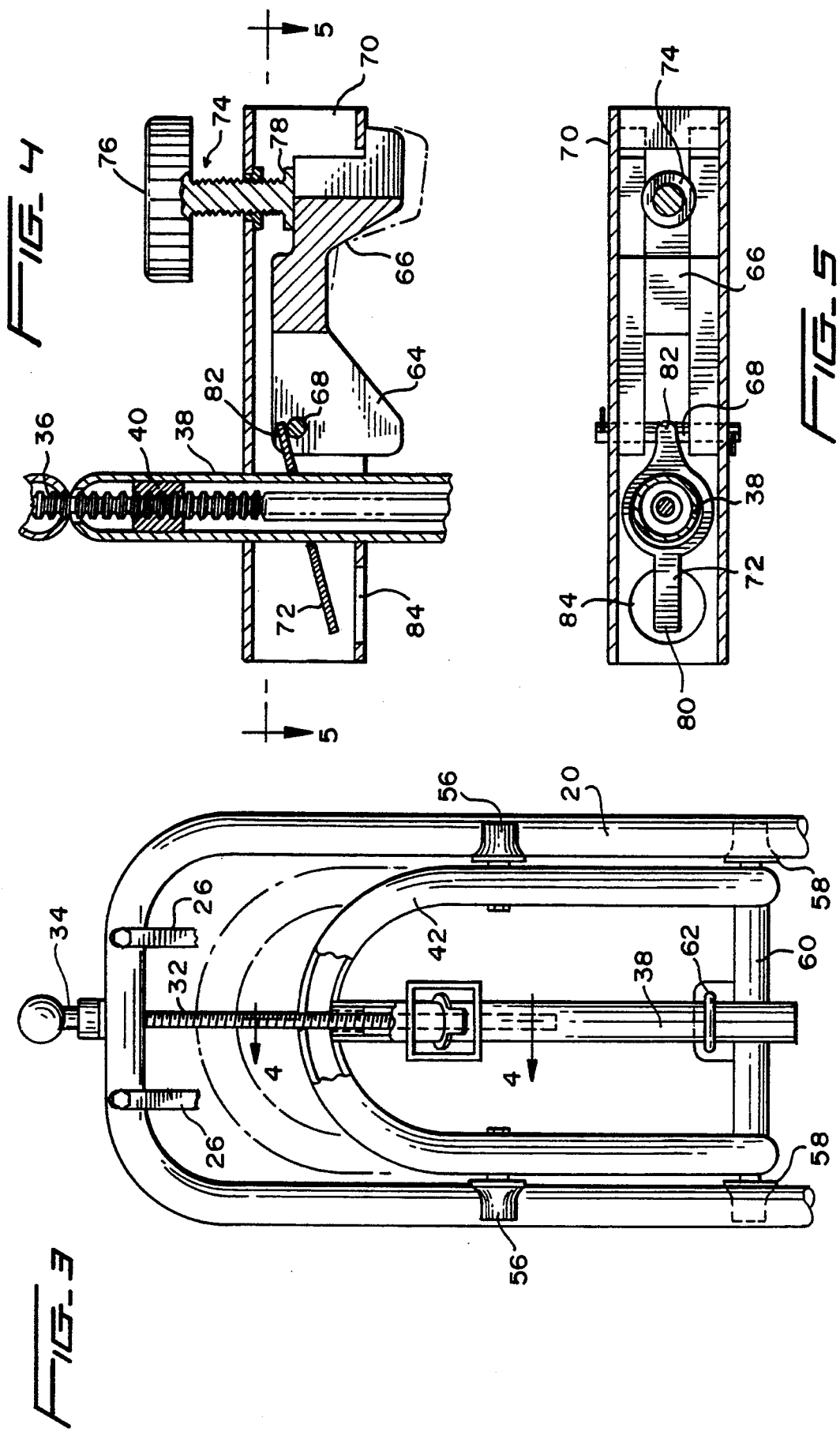

HAND CART FOR LIFTING AND TRANSPORTING TOILETS

BACKGROUND AND SUMMARY OF THE INVENTION

The present invention relates to a hand cart for transporting and installing toilets.

Heretofore, transportation and installation of toilets has been an awkward and cumbersome operation, normally requiring at least two men to carry and precisely fit the toilet at an installation site. Because the toilets are generally heavy and rather cumbersome to carry, workers are often injured and there is an extensive amount of breakage of the toilet itself because of mishandling.

Cart devices for both lifting and transporting heavy articles are known in the prior art. For example, the patent to Williams (U.S. Pat. No. 1,820,263), shows a truck for transporting annular objects, such as wheels, including a wheeled cart and a hand operated screw jack for lifting the wheels onto the cart frame. Another patent of interest is that to Davis, Jr. (U.S. Pat. No. 2,903,147), which shows a lifting and transporting cart for outboard motors, including a hand truck structure having a jack member which lifts and positions an outboard motor, enabling it to be attached to the back of a boat. Another patent of interest to Swallows (U.S. Pat. No. 4,632,627) shows a motor transport and worktable cart, including a base having front and rear wheels and an upright column, supported by the base, which in turn supports a platform for up and down movement by means of a winch. Other similar patents showing lifting devices combined with hand trucks or hand carts are disclosed in the patents to Sagert (U.S. Pat. No. 4,244,595), Ju (U.S. Pat. No. 4,737,065) and Berg (U.S. Pat. No. 4,741,659).

The present invention relates to a hand truck for lifting and transporting toilets, including a wheeled base, open at one end permitting straddling of the toilet, an elevator mechanism including a hand operated jack and a unique bowl engaging grapple and rim clamp, permitting a wide variety of toilet configurations to be securely gripped and lifted by the unit.

Among the objects of the present invention are the provisions of an improved hand cart for lifting and transporting toilets, requiring a minimum amount of manpower and eliminating costly bodily injuries and product damage.

Another object is the provision of a hand cart for lifting and transporting toilets, including a unique toilet gripping and lifting mechanism, which enables a toilet to be securely held during the lifting and transporting process.

Other objects will become apparent with reference to the following specification and drawings.

BRIEF DESCRIPTION OF THE DRAWINGS

FIG. 2 is a side elevational view, partly in section, of FIG. 1.

FIG. 3 is an end elevational view, partly in section, of FIG. 1.

FIG. 4 is a sectional view of a detail taken along the lines 4—4 of FIG. 3.

FIG. 5 is a sectional view taken along the lines 5—5 of FIG. 4.

DESCRIPTION OF THE PREFERRED EMBODIMENTS

Figure 1:
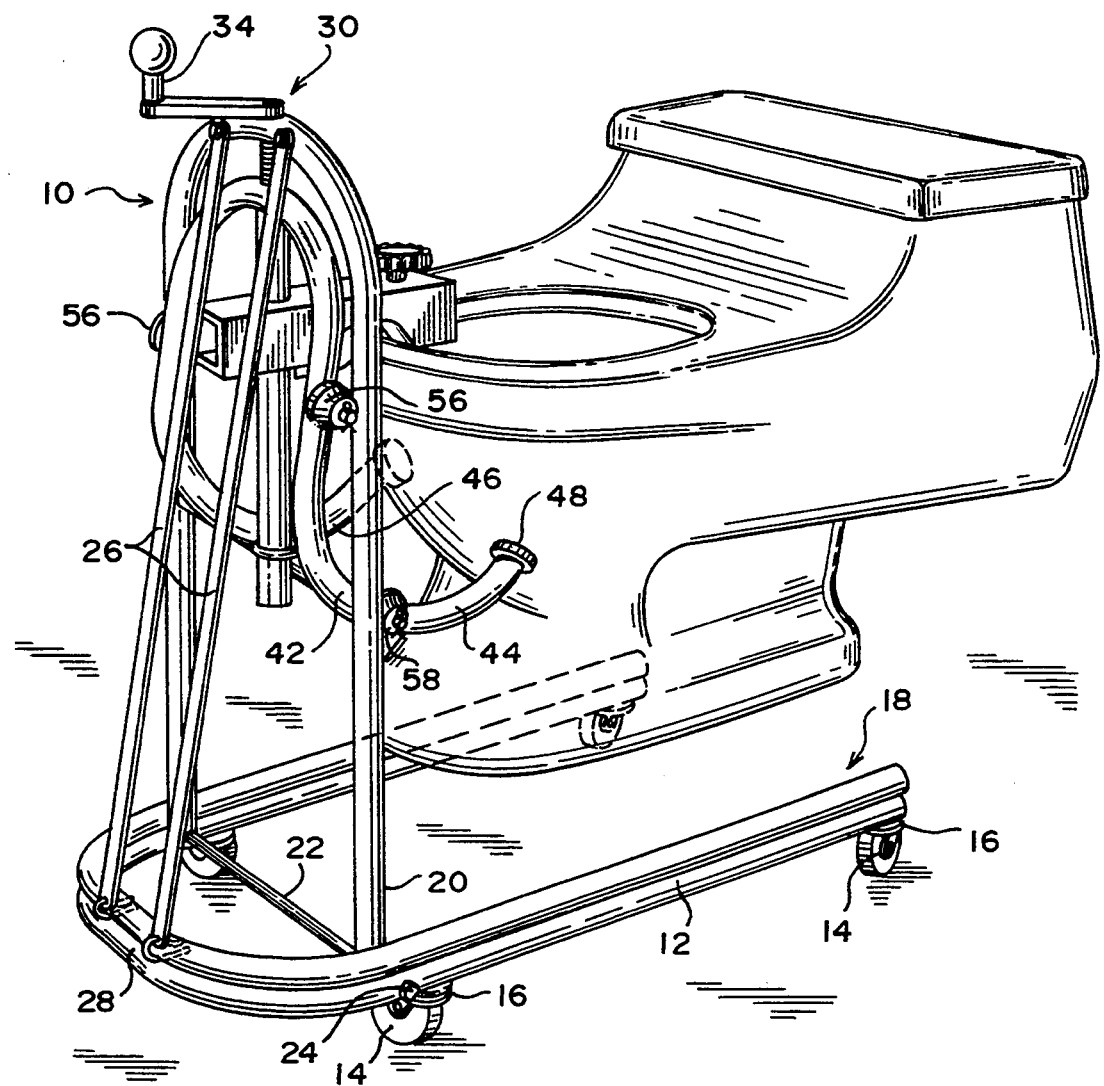
FIG. 1 is a perspective view of the hand cart of the present invention, showing a toilet lifted in an elevated position.

The Figures illustrate a hand cart 10 in accordance with the present invention for lifting and transporting toilets, and in particular, for facilitating installation of the toilet with a minimum of manpower and damage to the toilet and/or installation site. The cart includes a base 12 formed of tubular aluminum extrusions, wheels 14 and wheel supports 16. The base 12 is formed in U-shaped configuration, having an open end 18 which permits the cart 10 to straddle a toilet sitting on a flat surface, such as a floor. The cart 10 includes an upright support 20 in the form of a tubular extrusion member suitably secured to the base by means of a base strut 22 and fasteners 24 having a pair of upright members 21 and a U-shaped cross piece 23 at the upper ends of the upright members 21. Braces 26 are connected between a closed end 28 of the base 12 and the upright support 20 to provide stability.

The cart includes an elevator mechanism 30 which lifts a toilet from a flat ground surface and holds it above the base 12 of the cart, enabling the toilet to be supported above and transported along a ground surface by rolling the cart 10 on its wheels 14. The elevator mechanism 30 includes a hand operated screw jack 32, a bowl engaging grapple 42 and a rim engaging clamp 64. The elevator mechanism 30 also includes a cylindrical vertical strut 38 disposed parallel to the upright members 21 and perpendicular to the plane of the base 12. The vertical strut 38 is fixed to the bowl engaging grapple 42 and supports the screw jack 32 and the rim engaging clamp 64. The elevator mechanism 30 further includes a cylindrical horizontal strut 60 disposed perpendicular to the upright members 21 and parallel to the plane of the base 12. The hand operated screw jack 32 is operated by a rotatable handle 34 which raises and lowers the entire elevator mechanism 30 a distance corresponding to the pitch of the threads of the screw jack 32 as the handle 34 is turned.

Referring to the detail shown in FIG. 4, the screw jack 32 includes an elongated threaded rod 36, the upper end of which is fixed to the rotatable handle 34, which in turn is fixed to the cross piece upright support 20 so the upper end of the threaded rod is also fixed relative to the upright support 20. The lower portion of the threaded rod 36 engages a nut 40 fixed within the interior of the cylindrical strut 38. It will be appreciated that rotation of the handle 34 rotates the rod 36, which causes the rod 36 to move relative to the nut 40 and housing 38 attached thereto, either upwardly or downwardly, depending upon the direction of rotation. The upper portion of the housing 38 supports a serpentine-shaped bowl engaging grapple 42. The ends of the grapple 42 include a pair of arms 44 and 46 which are designed to engage the underside of the bowl of a toilet, as shown in the drawings. Preferably, the arms 44 and 46 include resiliently mounted cushion members 48 supported within the hollow end of the arms 44 and 46 by a spring 50. The cushions 48 are moveable so that the front face of each cushion 48 can directly abut any bowl configuration. The section 52 of the bowl engaging grapple 42 away from the arms 44 and 46 is U-shaped, with the arms 44 and 46 extending outwardly from the lower end of the U-shaped configuration. A strut member 60 connects the opposite sides of the grapple 42 at a point proximate the beginning of the arms 46 and 44. The horizontal strut 60 provides a lower support for the vertical strut 38, securing it by a suitable mechanical clamp 62.

The bowl engaging grapple 42 is designed to move upwardly and downwardly along with the vertical strut housing 38 when the screw jack 30 is operated so as to ride along upright portions 54 of the upright support 20 using a pair of wheels 56 and 58 attached to the grapple 42 adjacent the point where each of the arms 44 and 46 merge into the U-shaped section 52. The wheels 56 and 58 include concave bearing surfaces which ride along the tubular upright sections 54 of the support member 20. As can be seen from the drawings, the wheels 56 and 58 are offset from each other in a vertical and horizontal direction so as to ride on opposite sides of the upright portion 54 of the support 20. With this configuration, it is possible to move the elevator mechanism upwardly and downwardly a vertical direction, to lift a heavy weight, such as an eccentrically positioned toilet. The forces on the elevator which would tend to tip the cart downwardly are taken up by the interaction of the wheels 56 and 58 with the tubular upright support surfaces.

The rim engaging clamp 64 is shown in detail in FIGS. 4 and 5. The rim engaging clamp 64 includes a pivotably mounted jaw member 66 having one end secured to a pin 68. The jaw member 64 is mounted in a housing 70, which is slidably positioned on the vertical strut 38 so it may be moved upwardly or downwardly relative to the serpentine grapple 42. The housing 70 may be positioned along the length of the vertical strut 38 by an eccentric clip 72 which frictionally engages the vertical strut 38, preventing movement of housing 70. The rim engaging clamp 64 includes a jaw rotator 74 formed of a knob 76, and actuator 78 threadably mounted in an opening in the top of the housing 70, whereby turning of the knob 76 depresses or retracts the actuator 78 which in turn controls the pivotable movement of the jaw member 66.

The clip 72 includes a finger tab 80 and a pin tab 82 which rests on the pin 68 and causing the clip 72 to bind against the outer surface of the tubular housing 38 which keeps the rim-engaging clamp 64 against the bowl rim and prevents it from moving upward until the finger tab 80 is lifted by a user, inserting his finger through opening 84 and pushing the finger tab 82 upwardly.

In operation, with a toilet supported on a flat ground surface, the open end of the base is wheeled to straddle the base of a toilet. The screw jack 32 is operated to raise the elevator mechanism 30 a sufficient distance to enable the bowl engaging grapple 42 to abut the underside of the bowl. It will be appreciated that the adjustability of the hand cart 10 permits it to be used with a large variety of different shaped toilets. Once the bowl is engaged, the rim clamp 64 is adjustably positioned by releasing the eccentric clip 72 so that the rim clamp 64 sits on the rim of the toilet bowl. The jaw 64 is tightened by means of the adjustment knob 76 so that the toilet is firmly held by the grapple 42 and the clamp 64. To raise the toilet off the ground surface, it becomes a simple matter to continually rotate the jack handle 34 so that the vertical strut 38 is raised vertically along the threads of the screw jack 34. Once the toilet is raised above the ground surface, the cart may be readily rolled along by the wheels 14, enabling the toilet to be transported and eventually positioned in an installation site. Once the toilet is properly positioned at the installation site, it is a simple matter to lower the elevator mechanism 30 by operation of the jack handle to lower the toilet to its proper position.

The hand cart 10 may be folded in a flat position for storage by loosening and removing the braces 26 and allowing the upright support to pivot downwardly around fasteners 24 secured to the base 12.

While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. In combination with a toilet, a hand cart for lifting and transporting the toilet, comprising:
   a wheel base capable of being rolled along a ground surface;
   an upright support attached to said base, said upright support including at least two upright support members extending upwardly on opposite sides of the base of said hand cart; and,
   an elevator mechanism for grasping and lifting the toilet above the ground surface, said elevator mechanism including a bowl engaging grapple for grasping the underside of a bowl portion of the toilet and a rim engaging clamp for grasping a rim of the toilet, the grapple and clamp each being operable independently of the other;
   said bowl engaging grapple being serpentine in shape, including a section parallel to the upright support and a pair of bowl engaging arms and said grapple including means thereon for riding upwardly and downwardly on said upright support.

2. The combination of claim 1 wherein said riding means includes wheels on opposite sides of said grapple, which engage and ride upon the two upright support members.

3. The combination of claim 2 being further defined by two pairs of wheels on said grapple, one pair being disposed and riding on one side of said two upright members, and a second pair being disposed and riding on the opposite sides of said upright members.

4. The combination of claim 1 wherein said cart is collapsible whereby the support members may be folded downwardly to be parallel with the base for storage.

5. In combination with a toilet, a hand cart for lifting and transporting the toilet, comprising:
   a wheeled base capable of being rolled along a ground surface;
   an upright support attached to said base;
   an elevator mechanism for grasping and lifting the toilet above the ground surface, said elevator mechanism including a bowl engaging grapple for grasping the underside of a bowl portion of the toilet and a rim engaging clamp for grasping a rim of the toilet, the grapple and clamp each being operable independently of the other;
   said elevator mechanism further including a hand operated screw jack operably connected to said bowl engaging grapple and moving in unison therewith when raising and lowering the elevator mechanism;
   said elevator mechanism further including a vertical strut fixed to said bowl engaging grapple, said vertical strut supporting the screw jack and the rim engaging clamp; and, said rim engaging clamp being pivotably mounted and including means for pivotably rotating the clamp into and out of engagement with the rim.

6. The combination of claim 5 wherein said bowl engaging grapple is serpentine in shape and includes a pair of bowl engaging arms.

7. The combination of claim 6 wherein said bowl engaging arms further include restraint cushion members for engaging the bowl.

8. The combination of claim 5 wherein said upright support includes at least two upright support members extending upwardly on opposite sides of the base of said hand cart (and the serpentine shaped bowl engaging grapple includes a section parallel to the upright support and includes means on said grapple for riding upwardly and downwardly on said upright support).

9. In combination with a toilet, a hand cart for lifting and transporting the toilet, comprising:

a wheeled base capable of being rolled along a ground surface;

an upright support attached to said base;

an elevator mechanism for grasping and lifting the toilet above the ground surface, said elevator mechanism including a bowl engaging grapple for grasping the underside of a bowl portion of the toilet and a rim engaging clamp for grasping a rim of the toilet, the grapple and clamp each being operable independently of the other;

said elevator mechanism further including a hand operated screw jack operably connected to said bowl engaging grapple and moving in unison therewith when raising and lowering the elevator mechanism;

said elevator mechanism further including a vertical strut fixed to said bowl engaging grapple, said vertical strut supporting the screw jack and the rim engaging clamp, said rim engaging clamp being movable upwardly and downwardly on said vertical strut and including a releasable clip means for holding the clamp in a selected position on said vertical strut.

* * * * *